United States Patent [19]

Camello

[11] Patent Number: 5,666,579
[45] Date of Patent: Sep. 9, 1997

[54] CAMERA BACK WHICH ALLOWS TWO DISCRETE IMAGES TO BE SEQUENTIALLY EXPOSED ONTO SINGLE FILM UNIT

[75] Inventor: Paul A. Camello, Randolph, Mass.

[73] Assignee: Polaroid Corporation, Cambridge, Mass.

[21] Appl. No.: 638,503

[22] Filed: Apr. 26, 1996

[51] Int. Cl.$^6$ .................................... G03B 1/42
[52] U.S. Cl. .................. 396/323; 396/335; 396/340; 396/544
[58] Field of Search .................. 354/110, 120, 354/125, 159; 396/322, 323, 335, 340, 544

[56] References Cited

U.S. PATENT DOCUMENTS

| | | | |
|---|---|---|---|
| 2,989,907 | 6/1961 | Nelson | 354/125 |
| 3,088,390 | 5/1963 | Zimmerman | 354/125 |
| 3,124,050 | 3/1964 | Bay | 354/125 |
| 3,748,987 | 7/1973 | Bjork et al. | 354/124 |
| 3,762,293 | 10/1973 | Moodie | 354/124 |
| 3,852,780 | 12/1974 | Augustin, Jr. et al. | 354/86 |
| 4,149,790 | 4/1979 | Smith | 354/125 |
| 4,561,742 | 12/1985 | Stella et al. | 354/86 |

Primary Examiner—Safet Metjahic
Assistant Examiner—J. K. Han
Attorney, Agent, or Firm—Robert A. Sabourin

[57] ABSTRACT

A camera back for sequentially exposing two spatially separate images on regular or self-developing film adapted for a variety of single lens cameras. The camera back includes an adapter plate disposed between the camera and a film back wherein a dark slide is movable by the force of gravity between two positions in the adapter plate, by rotating the adapter plate 180 degrees, thereby blocking a lower half of the film from the exposing radiation. The dark slide is moved exclusively by its own weight, thereby making complicated levers and light-tight feedthroughs unnecessary.

3 Claims, 2 Drawing Sheets

CAMERA BACK WHICH ALLOWS TWO DISCRETE IMAGES TO BE SEQUENTIALLY EXPOSED ONTO SINGLE FILM UNIT

FIELD OF THE INVENTION

This invention relates to a photographic apparatus, and more particularly to a camera back adaptable to different cameras, wherein two discrete images can be exposed sequentially in spaced relationship on a single film unit.

BACKGROUND OF THE INVENTION

In many photographic applications, particularly when using large format film, the user wishes to accommodate more than one exposure on the same film unit. This applies to both conventional film and self-developing film. Examples for such applications are mini-portrait-cameras for providing photos for identification cards, passports, etc., where typically two or four spatially separate exposures are taken on the same film unit. It is also desirable for panorama pictures with a large aspect ratio, for instance 5:2, where two such pictures with dimensions of, for instance, 2 inches by 5 inches can easily be accommodated on a conventionally sized film with dimensions of 4 inches by 5 inches.

Photographic apparatus which allows sequentially exposing a plurality of spatially separate areas on a single film unit is well known in the art. In one approach, a number of separate lenses are provided, whereby each separate image is exposed by one of these lenses on stationary film (U.S. Pat. No. 3,069,987); in another approach, a single lens is provided, in combination with a film support which is movable from position to position on guard rails or through the use of various pin and hole locating structures (U.S. Pat. No. 3,762,293); in still another approach, a movable mask with suitable cut-outs is inserted between the film and the shutter and manipulated in relation to the film (U.S. Pat. No. 3,124,050); or the film is moved by means of gears and levers within a stationary, light-tight housing (U.S. Pat. No. 4,561,742). As seen from the prior art cited, all apparatus for exposing multiple multiple images either require a special camera with multiple lenses or, if the apparatus can be adapted for use with an existing camera, still require the external manipulation of film holders, dark slides, plates, or the like.

It would be highly desirable to be able to use conventional cameras and camera backs, for instance a standard 4×5 studio camera such as the Speed Graphic camera with a Graflok back (see U.S. Pat. No. 3,852,780), without modifications, for sequentially exposing spatially separate images on a film unit. It would be equally desirable to utilize the same "mask" which defines the imaged area of these images, also for composing and, in conjunction with a standard focusing screen, for focusing the image. The camera should be also useable with regular and with self-developing film.

SUMMARY OF THE INVENTION

It is therefore an object of the present invention to provide a camera back for sequentially exposing two spatially separate images on a film unit, wherein dark slides are autopositioning by means of gravity. It is a further object of the invention to retain the focus setting obtained with the standard focus screen for exposing both images. It is also an object of the invention to provide such a camera back for both self-developing and conventional cameras.

According to the invention, a camera back can be produced for any particular camera by making a rectangular plate, formed with a rectangular aperture registering with the exposure aperture of the film holder, with the inside faces of the aperture having a set of parallel grooves machined into them for guiding a moveable dark slide which covers an area approximately equal to one-half the aperture size. One face of the camera back is adapted to cooperate with the place face of the film holder to form a light-tight seal. The other face of the camera back may be formed in any conventional manner to complement the back structure of the particular camera with which it is adapted to cooperate.

The process for sequentially exposing two spatially separate images is explained below. The original image is first composed and focused on the standard focus screen of the camera, with the camera back disposed between the camera and the focus screen. The dark slide, due to its own weight, moves to or remains at a stop in a first (down) position in reference to the camera back. The focus screen is then replaced by the film back, the dark slide remains in the first position, and a first image is exposed on one-half of the film. The dark slide shields the bottom half of the film from the exposing radiation during the first exposure. After the first exposure, either the camera back can be rotated 180° to a second position in relation to the camera, or the camera can be physically mined upside-down, whereby gravity causes the dark slide to drop to a second position at the opposite stop, hereby shielding the previously exposed portion of the film from the exposing radiation. By this process, two spatially separate images are formed on the film unit. No further manipulation of the dark slide or of the film within the film holder is required. Since the spatially separate areas on the film unit are always exposed in the same location in the focal place of the camera, any distortions, aberrations, etc., caused by the lens unit will be identical for all exposures, and no further refocusing is required when spatially separate images are exposed or when film holders are interchanged, for instance between self-developing film and regular film.

Other objects and attainments together with a fuller understanding of the invention will become apparent and appreciated by referring to the following description and claims taken in conjunction with the accompanying drawings.

DETAILED DESCRIPTION

Figure 1:
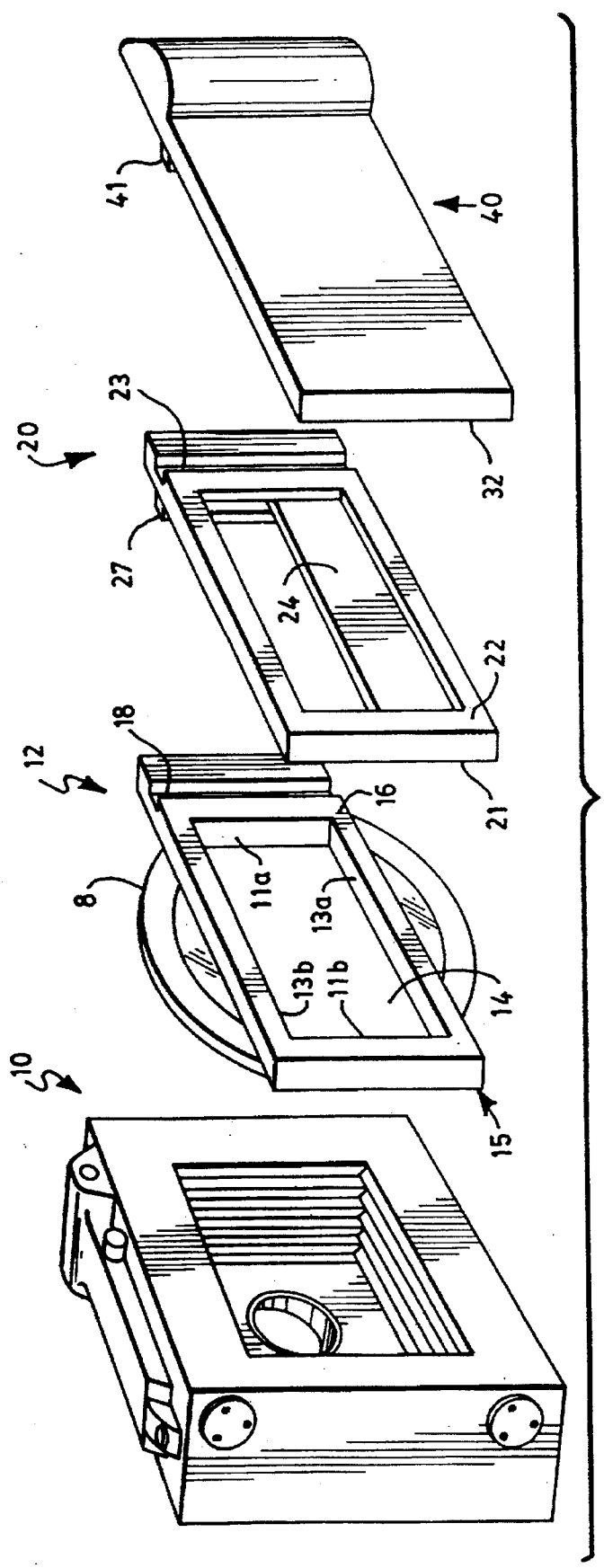
FIG. 1 is an exploded perspective view of a 4×5 camera including a rotating camera back, a film back, and a dark slide assembly in accordance with the invention which is disposed between the rotating camera back and the film back.
Figure 2:
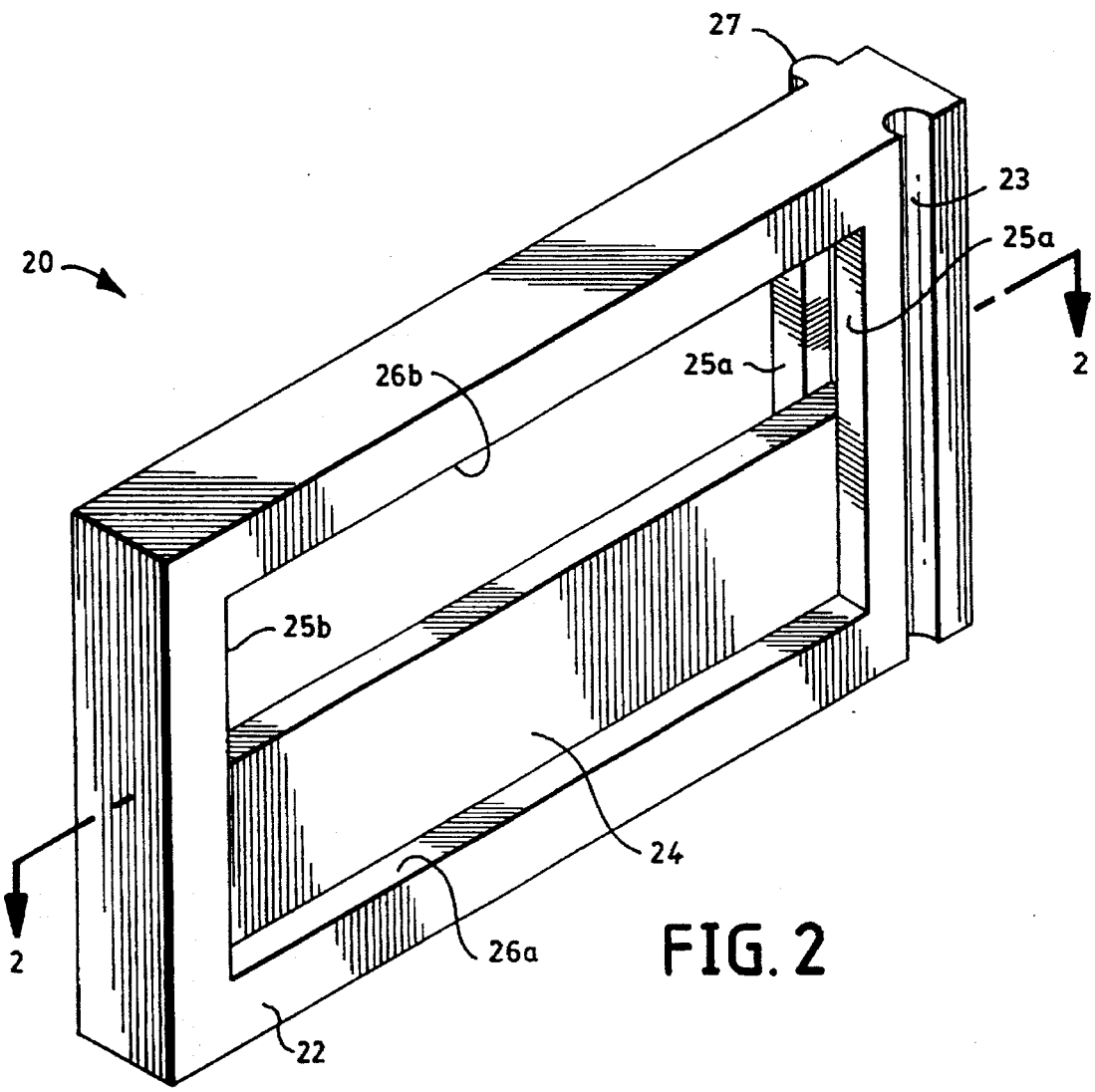
FIG. 2 is a perspective view of the dark slide assembly of FIG. 1 with a single dark slide for exposing two halves of a film unit in accordance with the invention.
Figure 3:
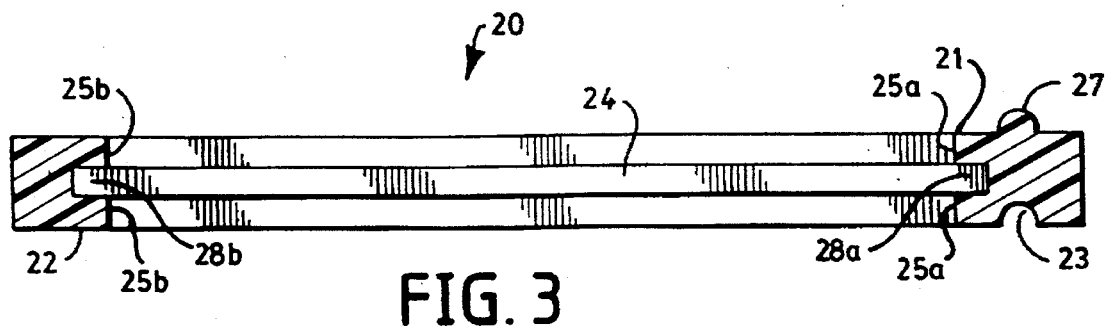
FIG. 3 is a cross-sectional view of the dark slide assembly of FIG. 2, taken along the lines 2—2 in FIG. 2.

Reference is now made to FIGS. 1-3 which show one preferred embodiment of the present invention as applied to a Polaroid instant camera.

FIG. 1 shows a perspective view of the rear of a conventional 4×5 camera 10 provided with a rotating back 12. The rotating back 12 is formed with a framing aperture 14 that is surrounded by a plane peripheral face 16 and connected to a rotating ring 8. The camera 10 and rotating back 12 are also provided with attachment and biasing means, like slides, flanges, clips, and springs, which are known in the art.

Referring to FIGS. 1–3, the camera back for sequentially exposing two images on separate halves of the same photographic paper comprises a dark slide assembly or adapter plate 20 formed with a first surface 21 adapted to engage the peripheral face 16 of the rotating back 12, and with a second surface 22 adapted to engage the forward portion of a film back 40. The first surface 21 is provided with a rib 27 adapted to extend into a slot 18 in the rotating back 12 to locate the adapter plate 20 relative to the framing aperture 14 in the rotating back 12. The second surface 22 is provided with a slot 23 adapted to accept a rib 41 in the film back or camera back 40 to locate the adapter plate 20 relative to the framing aperture 14 in the film back 40. The film back 40 may generally contain either self-developing or regular film.

As shown in FIG. 2, the adapter plate 20 has two sides 25a and 25b, a bottom 26a, and a top 26b. The adapter plate 20 forms a rectangular framing aperture having dimensions corresponding substantially to the exposure area of the film. Into the sides 25a and 25b of the framing aperture which are facing each other, are fabricated slots 28a and 28b for captively guiding a dark slide 24 between two stop positions located proximate to the two sides 26a and 26b at opposite ends of the guide slots. The dimensions of the dark slide 24 are preferably selected to cover half of the exposable imaging area.

The dark slide 24 is guided in such a manner that it will always slide to the lower portion of the flaming aperture in the adapter plate 20 by its own weight as long as the adapter plate 20 is maintained in a position (as shown in FIG. 2) where the slots 28a and 28b are substantially parallel to the direction of the force of gravity. There are no further mechanisms, such as levers or feedthroughs, which are externally required for operation of the dark slide 24.

The camera is assembled as shown in FIG. 1 with the adapter plate 20 adjacent to both the rotating back 12 and the film back 40. In this position, the dark slide 24 remains at the lower stop position 26a (FIG. 2). When the camera shutter (not shown) is opened, the dark slide 24 blocks exposure radiation from the lower portion of the film in film back 40 while allowing exposure of the upper portion of the film. At this point, one half frame of the film is being exposed. The adapter plate 20 together with the film back 40 are now rotated along rotating ring 8 by 180° in relation to the stationary camera 10, which causes the dark slide 24 to drop by its own weight into a position adjacent to the opposite stop position 26b. When the camera shutter is again opened, exposure radiation is blocked from exposing the previously exposed portion of the film while exposing the previously unexposed portion. At this point, the second half frame and thus the entire image area of the film has been exposed.

Since the adapter plate 20 is preferably formed from a single piece of material, with the slots 28a and 28b machined into the faces 25a and 25b, the dark slide 24 is preferably formed from a material and with a thickness to provide for easy insertion into the slots.

Of course, many variations of the above described preferred embodiment of the invention are realized. The essence of the invention is the dark slide assembly or adapter plate 20 for exposing different sections of a film. The adapter plate 20 operates when rotated so that the dark slide 24 moves due to the force of gravity to a position that blocks a section of the film from exposure during picture taking. The adapter plate 20 can be integrally connected to the main body of the camera 10 or, preferably, to the camera back or a film back, or the adapter plate can be detachable according to a designer's preference. Also, the dark slide 24 can vary in size. The rotation of the adapter plate 20 can be accomplished by rotating the whole camera 10, or by rotation along a rotating ring 8, or by any other rotation mechanism.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A camera back for allowing sequential exposure in a camera of two images onto a single sheet of film, said camera back comprising:

an adapter plate having an adapter plate opening defined by a bottom surface, a top surface, and two side surfaces each said side surface including a separate guiding slot positioned parallel to a direction of the force of gravity for captively guiding a dark slide driven by the force of gravity to a first image taking position adjacent to said bottom surface when said camera back is in an initial position and to a second image taking position adjacent to said top surface when said camera back is rotated 180° from the initial position, said dark slide blocking light from passing through a lower half of the adapter plate opening in both the first and second image taking positions, said adapter plate having a first surface including an adapter plate slot; and a film back having a forward surface including a film back rib engageable with said adapter plate slot for connecting said film back and said adapter plate, said film back containing said single sheet of film to be exposed by light passing through the adapter plate opening of said adapter plate.

2. A camera back for allowing sequential exposure in a camera of two images onto a single sheet of film, said camera back comprising:

an adapter plate having an adapter plate opening defined by a bottom surface, a top surface, and two side surfaces each said side surface including a separate guiding slot positioned parallel to a direction of the force of gravity for captively guiding a dark slide driven by the force of gravity to a first image taking position adjacent to said bottom surface and to a second image taking position adjacent to said top surface when said adapter plate is rotated 180° from the first image taking position, said dark slide blocking light from passing through a lower half of the adapter plate opening in both the first and second image taking positions, said adapter plate having a first surface including an adapter plate rib and a second surface including an adapter plate slot;

a film back having a forward surface including a film back rib engageable with said adapter plate slot for connecting said film back and said adapter plate, said filmback containing said single sheet of film to be exposed by light passing through the adapter plate opening; and means for rotating said connected adapter plate and film back by 180°.

3. A camera back for allowing sequential exposure in a camera of two images onto a single sheet of film, said camera back comprising:

a rotating back having a rotating ting and a frame connected thereto and connectably rotatable about said rotating ring, said frame having a frame opening defined by a first surface, a second surface, a third surface and a fourth surface, said frame having a front surface including a frame slot;

an adapter plate having an adapter plate opening corresponding to said frame opening and defined by a bottom surface, a top surface, and two side surfaces each said side surface having a separate guiding slot positioned parallel to a direction of the force of gravity for captively guiding a dark slide driven by the force of gravity to a first image taking position adjacent to said bottom surface when said camera back is in an initial position and to a second image taking position adjacent to said top surface when said camera back is rotated 180° from the initial position, said dark slide blocking light from passing through a lower half of the adapter plate opening in both the first and image taking second positions, said adapter plate having a first surface including an adapter plate rib engageable with said frame slot for connecting said adapter plate and said frame, and a second surface having an adapter plate slot; and a film back having a forward surface including a film back rib engageable with said adapter plate slot for connecting said film back and said adapter plate, said film back containing said single sheet of film to be exposed by light passing through the corresponding frame and adapter plate openings.

* * * * *